(12) United States Patent
Wilson et al.

(10) Patent No.: US 9,939,888 B2
(45) Date of Patent: Apr. 10, 2018

(54) CORRELATING MOVEMENT INFORMATION RECEIVED FROM DIFFERENT SOURCES

(75) Inventors: Andrew D. Wilson, Seattle, WA (US); Hrvoje Benko, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 805 days.

(21) Appl. No.: 13/233,018

(22) Filed: Sep. 15, 2011

(65) Prior Publication Data
US 2013/0069931 A1 Mar. 21, 2013

(51) Int. Cl.
*G06F 3/033* (2013.01)
*G06F 3/01* (2006.01)
(Continued)

(52) U.S. Cl.
CPC ............ *G06F 3/011* (2013.01); *G06F 1/1694* (2013.01); *G06F 3/014* (2013.01); *G06F 3/017* (2013.01);
(Continued)

(58) Field of Classification Search
CPC ......... G06T 7/004; G06T 7/20; G06T 7/0071; G06T 7/70073; G06T 7/0075; G06T 7/2093; G06T 19/006; G06T 11/60; G06T 19/003; G06T 2207/10004; G06T 2207/20144; G06T 2207/20221; G06T 5/00; G06T 5/30; G06T 7/0081; G06T 15/00; G06T 15/20; G06T 17/00; G06T 19/00; G06T 2200/08; G06T 2207/30196; G06T 2207/30241; A63F 13/52; A63F 13/537; A63F 2300/30; A63F 2300/303;
(Continued)

(56) References Cited

U.S. PATENT DOCUMENTS 6,181,343 B1 * 1/2001 Lyons ........................ 715/850
7,583,275 B2 9/2009 Neumann et al.
(Continued)

OTHER PUBLICATIONS

Lopez, et al., "Multimodal Sensing-Based Camera Applications," retrieved at <<http://www.ee.oulu.fi/~jhannuks/publications/SPIE2011b.pdf>>, Proceeding of the SPIE, vol. 7881, Jan. 25, 2011, 9 pages.
(Continued)

*Primary Examiner* — Sultana M Zalalee
(74) *Attorney, Agent, or Firm* — Katrina A. Lyon; Lyon & Harr, LLP

(57) ABSTRACT

A system is described herein which receives internal-assessed (IA) movement information from a mobile device. The system also receives external-assessed (EA) movement information from at least one monitoring system which captures a scene containing the mobile device. The system then compares the IA movement information with the EA movement information with respect to each candidate object in the scene. If the IA movement information matches the EA movement information for a particular candidate object, the system concludes that the candidate object is associated with the mobile device. For example, the object may correspond to a hand that holds the mobile device. The system can use the correlation results produced in the above-indicated manner to perform various environment-specific actions.

20 Claims, 11 Drawing Sheets

(51) Int. Cl.
*G06K 9/00* (2006.01)
*G06F 1/16* (2006.01)
*G06F 3/03* (2006.01)
*G06F 3/038* (2013.01)
*G06F 3/0346* (2013.01)

(52) U.S. Cl.
CPC ............ *G06F 3/0304* (2013.01); *G06F 3/038* (2013.01); *G06F 3/0346* (2013.01); *G06K 9/00335* (2013.01)

(58) Field of Classification Search
CPC ...... A63F 2300/6653; A63F 2300/8082; A63F 13/61; A63F 2300/6045; A63F 13/06; H04N 5/23219; H04N 5/2257; H04N 5/23254; H04N 5/23287; H04N 5/2628; H04N 5/23222; H04N 5/23238; H04N 5/23258; H04N 13/0014; H04N 13/007; H04N 13/0278; H04N 13/0438; H04N 13/0456; H04N 5/23245; H04N 5/23293; H04N 5/247; H04N 5/272; G06F 3/017; G06F 1/1694; G06F 2200/1637; G06F 3/0346; G06F 3/0304; G06F 3/013; G06F 3/04815; G06F 1/163; G06F 3/011; G06F 3/012; G06F 1/1686; G06F 2200/1614; G06F 1/1626; G06F 3/03547; G06F 17/30811; G06F 21/552; A61B 2562/0219; A63B 2220/803; A63B 2220/806; A63B 24/0006

See application file for complete search history.

(56) References Cited

U.S. PATENT DOCUMENTS

| | | | |
|---|---|---|---|
| 2003/0193572 A1 | 10/2003 | Wilson et al. | |
| 2005/0093868 A1 | 5/2005 | Hinckley | |
| 2006/0007141 A1 | 1/2006 | Wilson et al. | |
| 2006/0007142 A1 | 1/2006 | Wilson et al. | |
| 2006/0046709 A1 | 3/2006 | Krumm et al. | |
| 2006/0109245 A1 | 5/2006 | Wilson et al. | |
| 2007/0035562 A1* | 2/2007 | Azuma | G03B 13/28 345/633 |
| 2007/0124503 A1 | 5/2007 | Ramos et al. | |
| 2007/0290837 A1 | 12/2007 | Sarin et al. | |
| 2008/0136785 A1 | 6/2008 | Baudisch et al. | |
| 2008/0143840 A1 | 6/2008 | Corkum et al. | |
| 2008/0214233 A1 | 9/2008 | Wilson et al. | |
| 2008/0242415 A1* | 10/2008 | Ahmed | 463/39 |
| 2009/0122146 A1* | 5/2009 | Zalewski | A63F 13/06 348/169 |
| 2009/0207135 A1 | 8/2009 | Wilson et al. | |
| 2009/0209343 A1* | 8/2009 | Foxlin et al. | 463/36 |
| 2009/0221368 A1* | 9/2009 | Yen | A63F 13/10 463/32 |
| 2010/0113153 A1* | 5/2010 | Yen | A63F 13/06 463/37 |
| 2010/0150404 A1* | 6/2010 | Marks | G06T 7/20 382/107 |
| 2010/0197390 A1* | 8/2010 | Craig | G06K 9/00369 463/30 |
| 2010/0271302 A1 | 10/2010 | Pering et al. | |
| 2010/0316253 A1* | 12/2010 | Yang | G08B 21/0423 382/103 |
| 2011/0081048 A1* | 4/2011 | Woo | G06T 7/2033 382/103 |
| 2012/0050535 A1* | 3/2012 | Densham | H04N 5/2224 348/159 |

OTHER PUBLICATIONS

Hol, et al., "Sensor Fusion for Augmented Reality," retrieved at <<http://ieeexplore.ieee.org/stamp/stamp.jsp?tp=&arnumber=4085890>>, Proceedings of the 9th International Conference on Information Fusion, Jul. 10, 2006, 6 pages.

Tabar, et al., "Smart Home Care Network Using Sensor Fusion and Distributed Vision-Based Reasoning," Proceedings of the 4th ACM International Workshop on Video Surveillance and Sensor Networks, 2006, pp. 145-154.

Bleser, et al., "Advanced Tracking through Efficient Image Processing and Visual-Inertial Sensor Fusion," retrieved at <<http://ieeexplore.ieee.org/stamp/stamp.jsp?tp=&arnumber=4480765>>, Virtual Reality Conference, Mar. 2008, pp. 137-144.

Lobo, et al., "Fusing of Image and Inertial Sensing for Camera Calibration," retrieved at <<http://ieeexplore.ieee.org/stamp/stamp.jsp?tp=&arnumber=1013516>>, International Conference on Multisensor Fusion and Integration for Intelligent Systems, Aug. 2001, pp. 103-108.

Yun, et al., "A Simplified Quaternion-Based Algorithm for Orientation Estimation From Earth Gravity and Magnetic Field Measurements," retrieved at <<http://faculty.nps.edu/yun/pub/FQA_IM_paper.pdf>>, IEEE Transactions on Instrumentation and Measurement, vol. 57, No. 3, Mar. 2008, pp. 638-650.

"Triad Method," retrieved at <<http://en.wikipedia.org/wiki/Triad_Method>>, Wikipedia.org entry, retrieved on Sep. 13, 2011, 3 pages.

"Kalman Filter," retrieved at <<http://en.wikipedia.org/wiki/Kalman_filter>>, Wikipedia.org entry, retrieved on Sep. 13, 2011, 25 pages.

Premerlani, et al., "Direction Cosine Matrix IMU: Theory," retrieved at <<gentlenav.googlecode.com/files/DCMDraft2.pdf>>, May 17, 2009, 30 pages.

Schall, et al., "North-centred Orientation Tracking on Mobile Phones," retrieved at <<http://www.icg.tugraz.at/Members/schall/schall_ism>>, IEEE International Symposium on Mixed and Augmented Reality (ISMAR), Oct. 2010, 2 pages.

"Altitude Determination," retrieved at <<http://www.dept.aoe.vt.edu/~cdhall/courses/aoe4140/attde.pdf>>, Chapter 4, retrieved on Sep. 14, 2011, 23 pages.

Hinckley, Ken, "Synchronous Gestures for Multiple Persons and Computers," retrieved at <<http://www.acm.org>>, Proceedings of the 16th Annual ACM Symposium on User Interface Software and Technology, 2003, pp. 149-158.

Ramos, et al., "Synchronous Gestures in Multi-Display Environments," retrieved at <<http://research.microsoft.com/en-us/um/people/kenh/all-published-papers/synchronous-gestures-hci-journal.pdf>>, retrieved on Sep. 14, 2011, 105 pages.

Wilson, et al., "BlueTable: Connecting Wireless Mobile Devices on Interactive Surfaces Using Vision-based Handshaking," retrieved at <<http://www.acm.org>>, Proceedings of Graphics Interface 2007, 2007, pp. 119-125.

Wilson, et al., "XWand: UI for Intelligent Spaces," retrieved at <<http://www.acm.org>>, Proceedings of the SIGCHI Conference on Human Factors in Computing Systems, 2003, pp. 545-552.

* cited by examiner

CORRELATING MOVEMENT INFORMATION RECEIVED FROM DIFFERENT SOURCES

BACKGROUND

Different techniques are available to determine the movement of objects within a scene. In one such approach, markers can be attached to objects within the scene, to provide marked objects. A monitoring system can then perform image-based tracking of the marked objects within the scene. This approach, however, is not fully satisfactory because it is complex, expensive, intrusive, and inconvenient. This approach may also fail to yield results having sufficient precision for some applications.

SUMMARY

An illustrative system is described herein which receives internal-assessed (IA) movement information from a mobile device. The IA movement information describes the movement of the mobile device from the perspective of the mobile device itself. The system also receives external-assessed (EA) movement information from at least one monitoring system. The monitoring system captures a scene which contains a subject that is interacting with the mobile device. The system then compares the IA movement information with the EA movement information with respect to a plurality of candidate objects in the scene. If the IA movement information matches the EA movement information for a particular candidate object under consideration, the system can conclude that this candidate object corresponds to an object which is associated with the mobile device.

For example, the scene may contain a user who is holding and manipulating the mobile device. The system can use the above-described procedure to determine which part of the user is associated with the mobile device. In other words, in this case, the object associated with the mobile device corresponds to a hand of the user which holds and manipulates the mobile device, or which is otherwise associated with the mobile device.

The system can use various techniques to perform the above-described comparing operation. In one technique, the system can subtract the effects of gravity from the IA movement information, and then compare the resultant IA-corrected movement information with the EA movement information. To perform this calculation, the system relies on knowledge of the absolute orientation of the mobile device. In a first approach, the system can directly calculate the absolute orientation based on the IA movement information. In a second approach, the system can indirectly determine the orientation of the mobile device by successively guessing at it in the course of the comparing operation.

In yet another case, the system can perform the comparing operation by generating features that describe the IA movement information and the EA movement information. The system can then compare the IA features with the EA features.

The system also implements various applications of the correlation results produced by the above-described procedure. In one case, the system can use the correlation results to supplement the EA movement information with the IA movement information. This combination is beneficial because the IA movement information may express knowledge (such as the orientation of the user's hands) which cannot readily be obtained from the EA movement information alone. In another case, the system can use the correlation results to fuse together the IA movement information and the IA movement information, thus producing more precise position information.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative system for correlating internal-assessed (IA) movement information (obtained from a mobile device) with external-assessed (EA) movement information (obtained from an external monitoring system). Section B describes illustrative methods which explain the operation of the system of Section A. Section C describes illustrative computing functionality that can be used to implement any aspect of the features described in Sections A and B.

Figure 16:
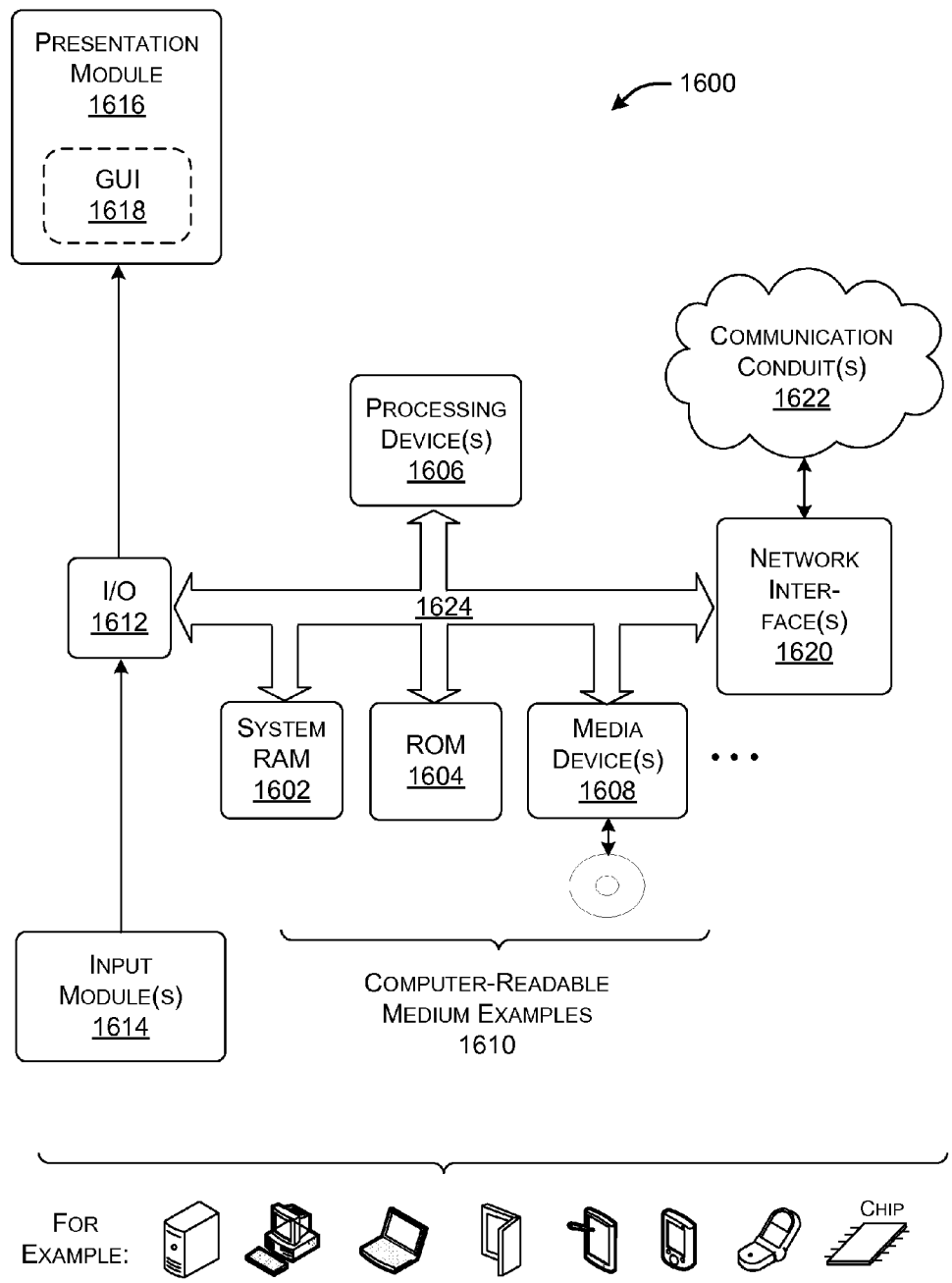
FIG. 16 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 16, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/ or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that that portion of the statute.

Figure 1:
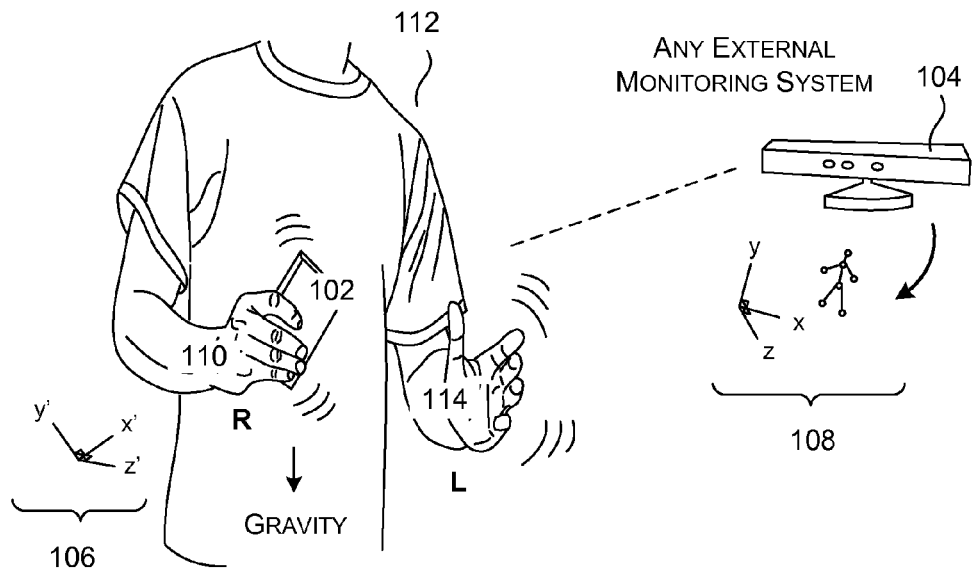
FIG. 1 shows one manner of using a system which correlates internal-assessed (IA) movement information (obtained from a mobile device) and external-assessed (EA) movement information (obtained from an external monitoring system).

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Systems FIG. 1 shows an illustrative environment which serves as a vehicle for introducing the system described herein. The system receives movement information from various sources. The movement information describes the movement of a mobile device 102. More specifically, the system receives internal-assessed (IE) movement information from at least one mobile device 102. The system further receives external-assessed (EA) movement information from at least one external monitoring system 104. The IA movement information is qualified as being "internal" because it is generated by the mobile device 102 itself, with respect to a frame of reference 106 of the mobile device 102. The AE movement information is qualified as "external" because it is generated by the external monitoring system 104 from a frame of reference 108 that is external to the mobile device 102. In other words, the external monitoring system 104 observes the mobile device 102 from a vantage point that is external to the mobile device 102.

Generally speaking, the mobile device 102 is associated with at least one object. That object, in turn, is a part of a subject which moves within a scene. For example, in the merely representative case of FIG. 1, the mobile device 102 comprises a handheld unit that is associated with the right hand 110 of a human being (henceforth referred to as the user 112). As such, in this case, the object corresponds to the user's right hand 110, and the subject corresponds to the user 112. There is at least one other object associated with the subject. For example, the user 112 has other anatomical parts, such as a left hand 114. Any of the parts of a subject may be in motion at any given time.

As will be explained in detail below, one purpose of the system is to identify the object that is associated with the mobile device 102. For example, in the merely illustrative case of FIG. 1, the system seeks to determine which hand is holding the mobile device 102. The system performs this task by correlating the IA movement information with the IA movement information for each candidate object of the subject. This produces correlation results. For example, the system compares the IA movement information (which is generated by the mobile device 102) with EA movement information associated with the right hand 110. It then compares the IA movement information with the EA movement information associated with the left hand 114. The system will discover that the IA movement information matches the EA movement information for the right hand 110, but not the left hand 114. On the basis of these results, the system can conclude that the user is holding and moving the mobile device 102 with his or her right hand 110. The system can then use this conclusion to perform any environment-specific actions.

The system can be applied to many other scenarios. For example, in the representative case of FIG. 1, the mobile device 102 corresponds to a piece of equipment that the user grasps and manipulates with a hand. For example, this type of equipment may comprise a pointing device, a mobile telephone device, a game controller device, a game implement (such as a paddle or racket) and so on. But, more generally, the mobile device 102 can correspond to any piece of equipment of any size and shape and functionality that can monitor its own movement and report that movement to the system. For example, in other environments, the mobile device 102 may correspond to any piece of equipment that is worn by the user 112 or otherwise detachably fixed to the user. For example, the mobile device 102 can be integrated with (or otherwise associated with) a wristwatch, pair of paints, dress, shirt, shoe, hat, belt, wristband, sweatband, patch, button, pin, necklace, ring, bracelet, eyeglasses, goggles, and so on.

Further, in the representative case of FIG. 1, the subject corresponds to a user 112 and the objects correspond to parts of the body of the user 112. In other cases, the subject may correspond to an inanimate object having any constituent parts. For example, the subject may correspond to a robot or other automated piece of machinery having various moving parts.

In other cases, a scene contains two or more subjects, such as two or more users (not shown in FIG. 1). Each user may hold (or wear) his or her own mobile device. In this context, the system can determine the association between mobile devices and respective users. The system can also identify the part of the body of each user that is associated with each mobile device (e.g., by determining which hand of the user is holding his or her own mobile device).

In yet other cases, the object that is associated with the mobile device 102 is actually a part of the mobile device 102 itself. For example, the object may correspond to the housing of a mobile phone, the paddle of a game implement, etc. Still further interpretations of the terms "mobile device," "subject," and "object" are possible. However, to facilitate explanation, most of the examples which follow will assume that the object corresponds to a part of the user's anatomy which holds or is otherwise associated with the mobile device 102.

Figure 2:
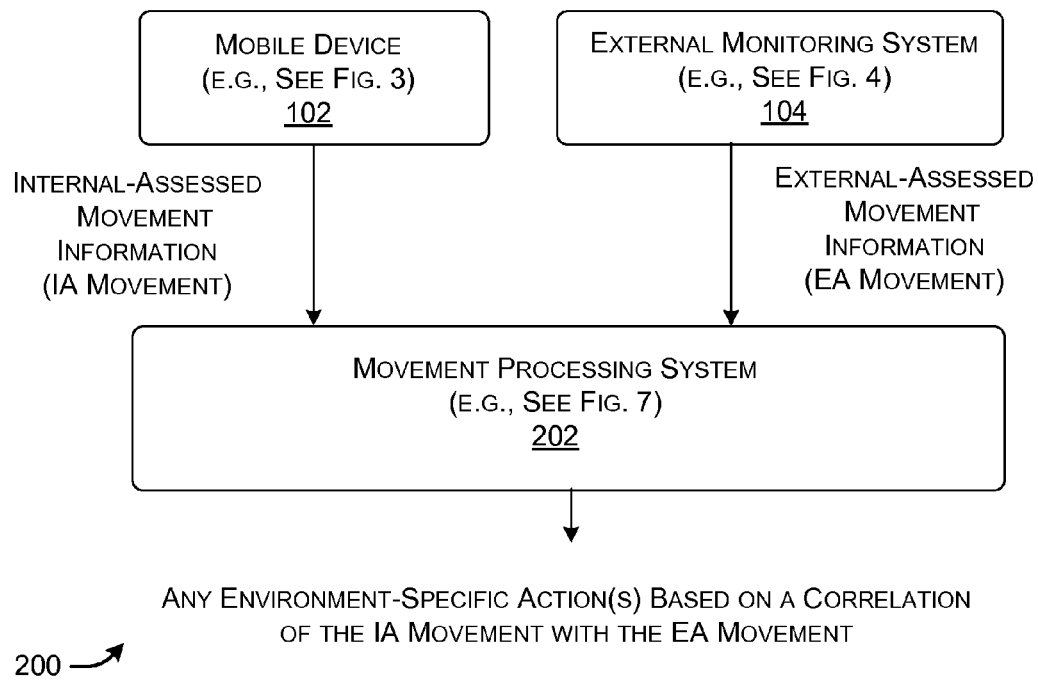
FIG. 2 shows a high-level depiction of the system that is being used in FIG. 1.

FIG. 2 shows a high-level block depiction of a system 200 that performs the functions summarized above. The system 200 includes the mobile device 102, the external monitoring system 104, and a movement processing system 202. The mobile device 102 supplies IA movement information to the movement processing system 202. The external monitoring system 104 provides EA movement information to the movement processing system 202. The movement processing system 202 performs correlation analysis using the IA movement information and the EA movement information for each object associated with the subject.

Figure 3:
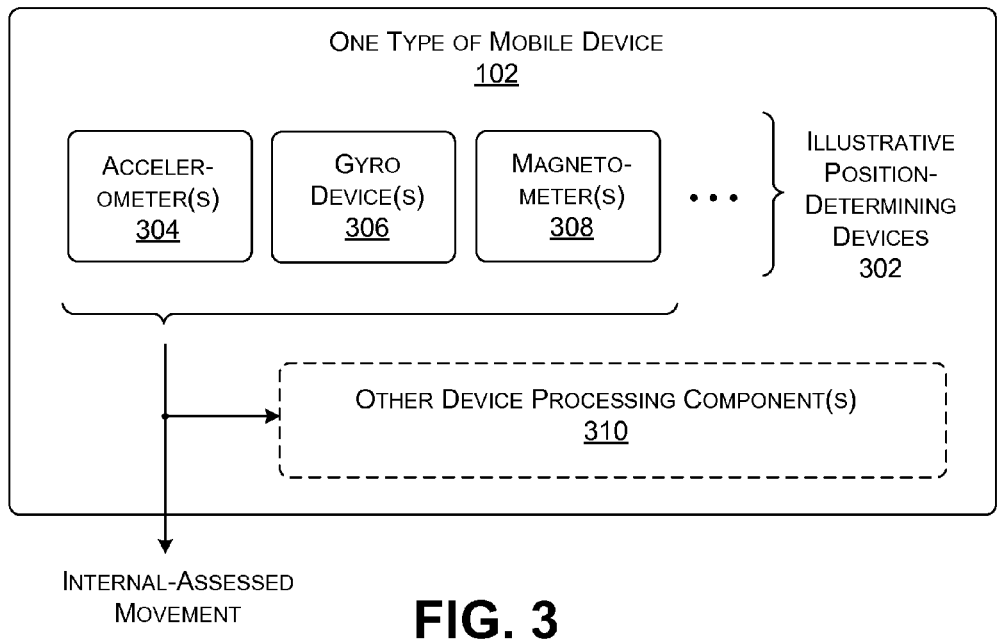
FIG. 3 shows an illustrative mobile device for use in the system of FIG. 2.

FIG. 3 shows an overview of one type of mobile device 102. The mobile device 102 incorporates or is otherwise associated with one or more position-determining devices 302. For example, the mobile device 102 can include one or more accelerometers 304, one or more gyro devices 306, one or more magnetometers 308, one or more GPS units (not shown), one or more dead reckoning units (not shown), and so on. Each of the position-determining devices 302 uses a different technique to detect movement of the device, and, as a result, to provide a part of the IA movement information.

The mobile device 102 may include one or more other device processing components 310 which make use of the IA movement information for any environment-specific purpose (unrelated to the movement analysis functionality described herein). The mobile device 102 also sends the IA movement information to one or more destinations, such as the movement processing system 202. The mobile device 102 can also send the IA movement information to any other target system, such as a game system.

Figure 4:
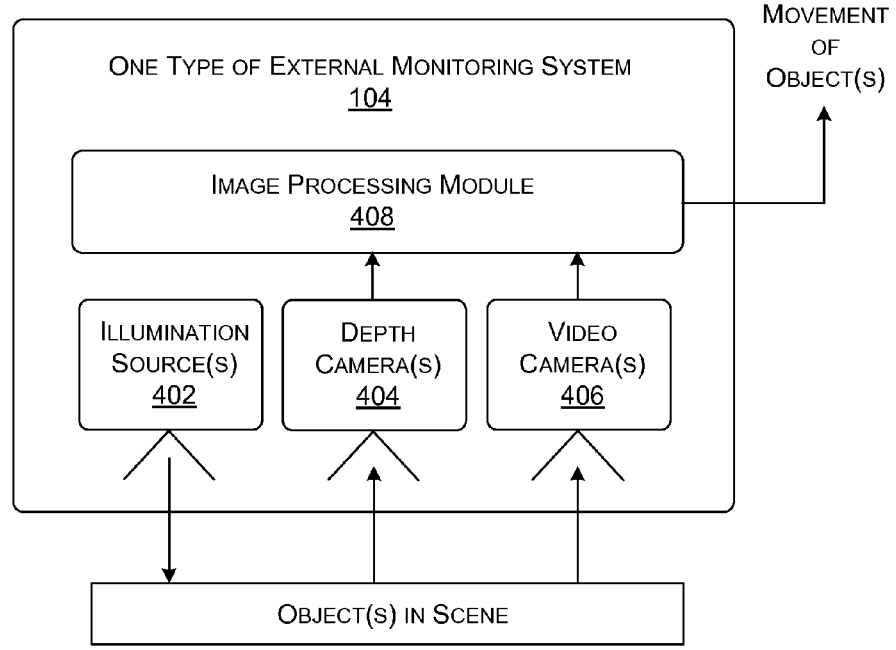
FIG. 4 shows an illustrative external monitoring system for use in the system of FIG. 2.

FIG. 4 shows an overview of one type of external monitoring system 104. In general, the external monitoring system 104 can use one or more data capture techniques to capture a scene which contains a subject, such as the user 112. For example, the external monitoring system 104 can investigate the scene by irradiating it using any kind electromagnetic radiation, including one or more of visible light, infrared light, radio waves, etc. Alternatively, or in addition, the external monitoring system 104 can use sounds waves to identify objects in the scene.

In the particular and non-limiting case of FIG. 4, the external monitoring system 104 includes an illumination source 402 which bathes the scene in infrared light. For example, the infrared light may correspond to structured light which provides a pattern of elements (e.g., dots, lines, etc.). The structured light deforms as it is cast over the surfaces of the objects in the scene. A depth camera 404 captures the manner in which the structured light is deformed. Based on that information, the depth camera 404 can derive the distances between different parts of the scene and the external monitoring system 104. These distances, in turn, reflect the three-dimensional shapes of objects in the scene. The depth camera 404 can alternatively, or in addition, use other techniques to generate the depth image, such as a time-of-flight technique, a stereoscopic correspondence technique, etc.

The external monitoring system 104 can alternatively, or in addition, capture other images of the scene. For example, a video camera 406 can capture an RGB video image of the scene.

An image processing module 408 can process the depth image provided by the depth camera 404 and/or one or more other images of the scene provided by other capture units. For example, the image processing module 408 can identify objects within the depth image. The image processing module 408 can then determine the movement of these objects. This yields EA movement information according to the terminology used herein.

Figure 5:
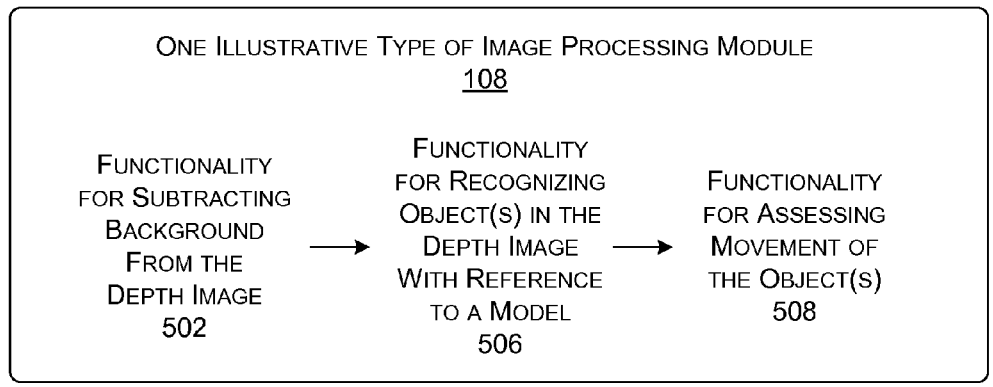
FIG. 5 shows an illustrative image processing module that can be used in the external monitoring system of FIG. 4.

FIG. 5 shows one non-limiting implementation of the image processing module 408 of FIG. 4. In this implementation, the image processing module 408 can process the depth image in a series of operations that together make up an image processing pipeline. First, the image processing module 408 may employ functionality 502 for removing background information from the depth image. The image processing module 408 can perform this task by identifying moving parts of the depth image within a certain range of distances from the external monitoring system 104. These parts constitute foreground content. The image processing module 408 can also identify generally static parts of the depth image. These parts constitute background content. Some of the background content may lie behind the foreground content, with respect to the position of the external monitoring system 104. As a result of this operation, the image processing module 408 produces a background-subtracted depth image.

Figure 6:
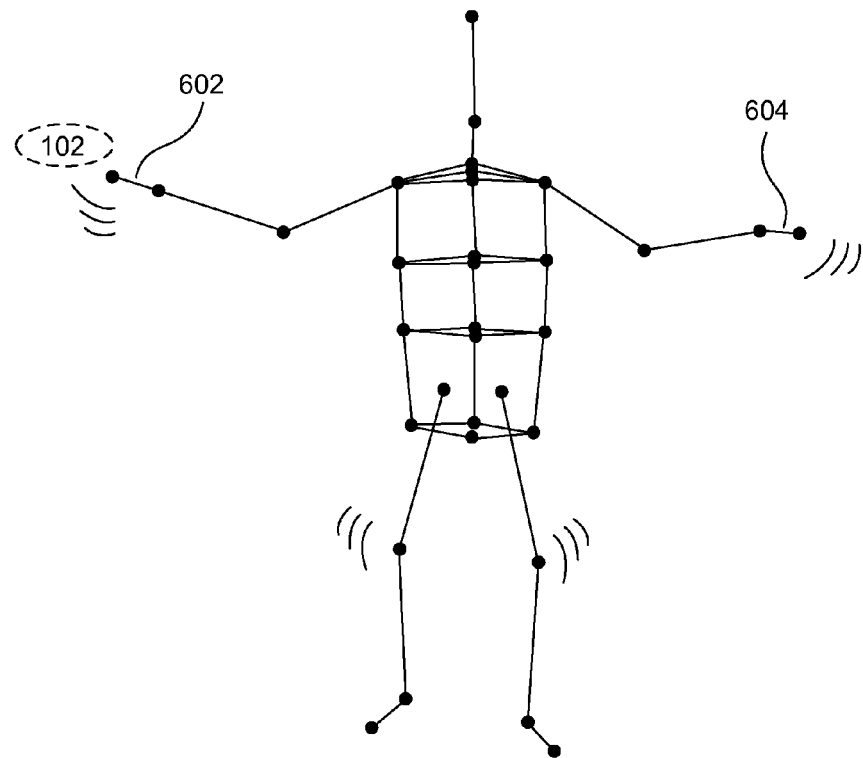
FIG. 6 shows an illustrative skeleton model that can be used in the image processing module of FIG. 5 to identify objects associated with a subject.

The image processing module 408 may next employ functionality 504 for recognizing objects in the background-subtracted depth image. In one approach, the image processing module 408 performs this task by comparing the content in the background-subtracted depth image with one or more models. Each model describes the appearance (and/or behavior) of one or more subjects that the image processing module 408 expects to find within typical scenes. For example, a model may describe the appearance and/or behavior of a human being, where that human being is made up of a plurality of anatomical parts (corresponding to objects). FIG. 6, for instance, shows a model which represents a human being as a skeleton comprising a collection of joints and a collection of limbs which connect the joints.

In one approach, the image processing module 408 can perform the above-described comparison operation in a probabilistic manner. In this process, the image processing module 408 compares the content of the background-subtracted depth image with each of a plurality of skeleton models. Each skeleton model may correspond to a human being in a respective pose. The image processing module 408 can then choose the model that has the highest likelihood of matching the content of the background-subtracted depth image. Since the model has a plurality of parts, by identifying a model, the image processing module 408 implicitly recognizes objects within the scene.

The image processing module 408 may next employ functionality 506 for assessing the movement of objects (e.g., anatomical parts) that have been recognized in the background-subtracted depth image. For example, the image processing module 408 can determine changes in the positions of the objects over time, to provide time-stamped position information. The image processing module 408 can then use one or more processing models (such as one or more Kalman filters, etc.) to estimate the accelerations of the objects based on the time-stamped position information.

For example, as shown in FIG. 6, the image processing module 408 can identify an object 602 corresponding to the right hand 110 of the user 112 (of FIG. 1). The right hand 110 holds the mobile device 102. The image processing module 408 can also identify an object 604 corresponding to the left hand 114 of the user. The image processing module 408 can then determine the acceleration of at least these two body parts as a function of time. This information represents the above-described EA movement information (or part thereof).

As will be set forth in greater detail below, although the image processing module 408 may be able to track certain parts of the human anatomy, it may not be able to track these parts with high precision (in some cases). For example, consider the case in which the object 602 represents the right hand 110 of the user 112. The image processing module 408 may be unable to determine subtleties of the orientation of the right hand 110 (or it may be unable to determine any information regarding the orientation of the right hand 110). The image processing module 408 may also be unable to determine individual finger movement of the right hand 110. Moreover, the image processing module 408 may provide the EA movement information at relatively high latency and a relatively low sampling rate. As will be described below, the system 200 can overcome both of these shortcomings by combining the EA movement information with the IA movement information in various ways.

The above-described case in which the image processing module 408 tracks the movement of the user's two hands serves as merely one representative example. More generally, the image processing module 408 can detect and track any number of objects associated with a human being. For example, the image processing module 408 may not know a priori that the user is holding the mobile device 102 in one of his or her hands. Accordingly, the image processing module 408 can recognize and track all of the identifiable parts of the user's body. Further, the image processing module 408 can track any other type of subject (such as a robot or other automated machine). Further, the image processing module 408 can track plural objects that belong to plural subjects.

The Kinect™ controller provided by Microsoft Corporation of Redmond, Wash., can be used to implement at least parts of the external monitoring system 104. Further, the system and techniques described in co-pending and commonly-assigned U.S. Ser. No. 12/603,437 (the '437 application), filed on Oct. 21, 2009, can also be used to implement at least parts of the external monitoring system 104. The '437 application is entitled "Pose Tracking Pipeline," and names the inventors of Robert M. Craig, et al. The '437 application is incorporated herein by reference in its entirety.

The external monitoring system 104 can alternatively (or in addition) be implemented using other techniques. For example, in another case, the external monitoring system 104 can capture a video image of the scene. The external monitoring system 104 can then extract features from the video image and use those features to identify objects within the scene. This feature-matching operation can be performed by comparing the features to predetermined models, or without making reference to models (where the models describe known shapes and/or behaviors of objects that are expected to be encountered in the scene). Further, the feature-matching operation can be performed with or without the use of markers added to different objects in the scene.

Finally, FIG. 1 illustrates the use of a single external monitoring system 104. However, the system 200 can be used in conjunction with two or more external monitoring systems, each of which supplies EA movement information to the movement processing system 202. For example, an environment can be set up with two or more Kinect™ controllers disposed at different locations with respect to the user 112. Each Kinect™ controller can capture a different part of the scene, generating different instances of the EA movement information. The image processing module 408 can use the plural instances of the EA movement processing information to construct a more complete representation of the scene (compared to the representation of the scene that can be obtained using a single Kinect™ controller).

Figure 7:
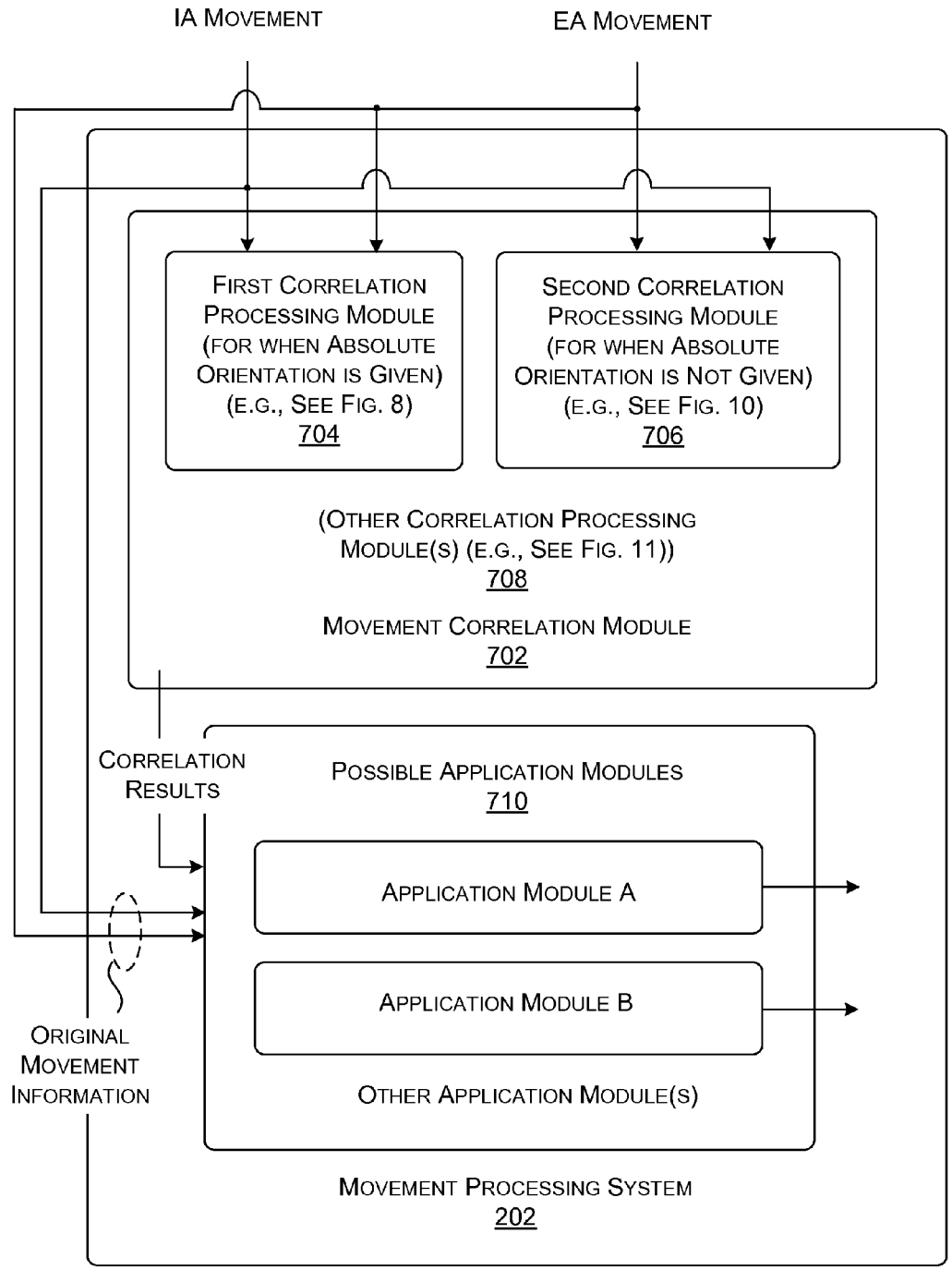
FIG. 7 shows an illustrative movement processing system for use in the system of FIG. 2.

Advancing to FIG. 7, this figure shows one implementation of the movement processing system 202 introduced in FIG. 2. The movement processing system 202 receives the IA movement information from the device 102 and the EA movement information from the external monitoring system 104. The mobile device 102 and the external monitoring system 104 can forward their respective movement information to the movement processing system 202 in any way, such as by wireless communication mechanism(s), wired communication mechanism(s), or combination thereof.

The movement processing system 202 includes a movement correlation module 702 for correlating the IA movement information with the EA movement information with respect to one or more objects in the scene. The movement correlation module 702, in turn, can draw on one or more processing modules to perform this task. In one case, the mobile device 102 is capable of assessing its absolute orientation (in the illustrative manner to be described in Section B). In this case, the movement correlation module 702 can employ a first correlation processing module 704 to perform the correlation. One manner of operation of the first correlation processing module 704 is described in FIGS. 8 and 9 in Section B. In another case, the mobile device 102 is not capable of assessing its absolute orientation, e.g., because it may only contain an accelerometer. In this case, the movement correlation module 702 can employ a second correlation processing module 706 to perform the correlation. One manner of operation of the second correlation processing module 706 is described in FIGS. 8 and 10 in Section B.

The movement correlation module 702 can also employ one or more additional correlation processing modules 708. For example, the movement correlation module 702 can use a feature-matching approach to correlate the IA movement information and the EA movement information, as described in greater detail in the context of FIG. 11 in Section B.

In any event, the output of the movement correlation module 702 represents correlation results. The correlation results describe, on an object by object basis, whether the IA movement information matches the EA movement information. This information indicates, in turn, which parts of the subject are associated with the moving mobile device 102. For example, the correlation results can indicate that the user 112 in FIG. 1 is moving the mobile device 102 with his or her right hand 110.

Application modules 710 may encompass one or more application modules for performing any environment-specific actions on the basis of the correlation results provided by the movement correlation module 702. The application modules 710 may also receive the original IA movement information and the EA movement information. For example, one type of application module can use the IA movement information to supply movement information (such as hand orientation information) that cannot readily be obtained from the EA movement information by itself.

Another type of application module can fuse the IA movement information with the EA movement information to yield more precise position information (or any type of movement information), compared to the position information that which can be obtained from either the IA movement information or the EA movement information when considered by itself. This type of application module can rely on any type of data fusion algorithm, such as a Kalman filtering technique, a Bayesian inference technique, a voting technique, a neural network technique, and so on.

The movement processing system 202 can be implemented by any type of computing functionality, such as by one or more computer devices. These devices (if plural are used) can be provided in a single location or can be distributed over plural locations. Section C provides additional information regarding one implementation of the movement processing system 202.

B. Illustrative Processes

FIGS. 8-15 show procedures and illustrative examples that set forth one manner of operation of the system 200 described in Section A. Since the principles underlying the operation of the system 200 have already been described in Section A, certain operations will be addressed in summary fashion in this section.

Figure 8:
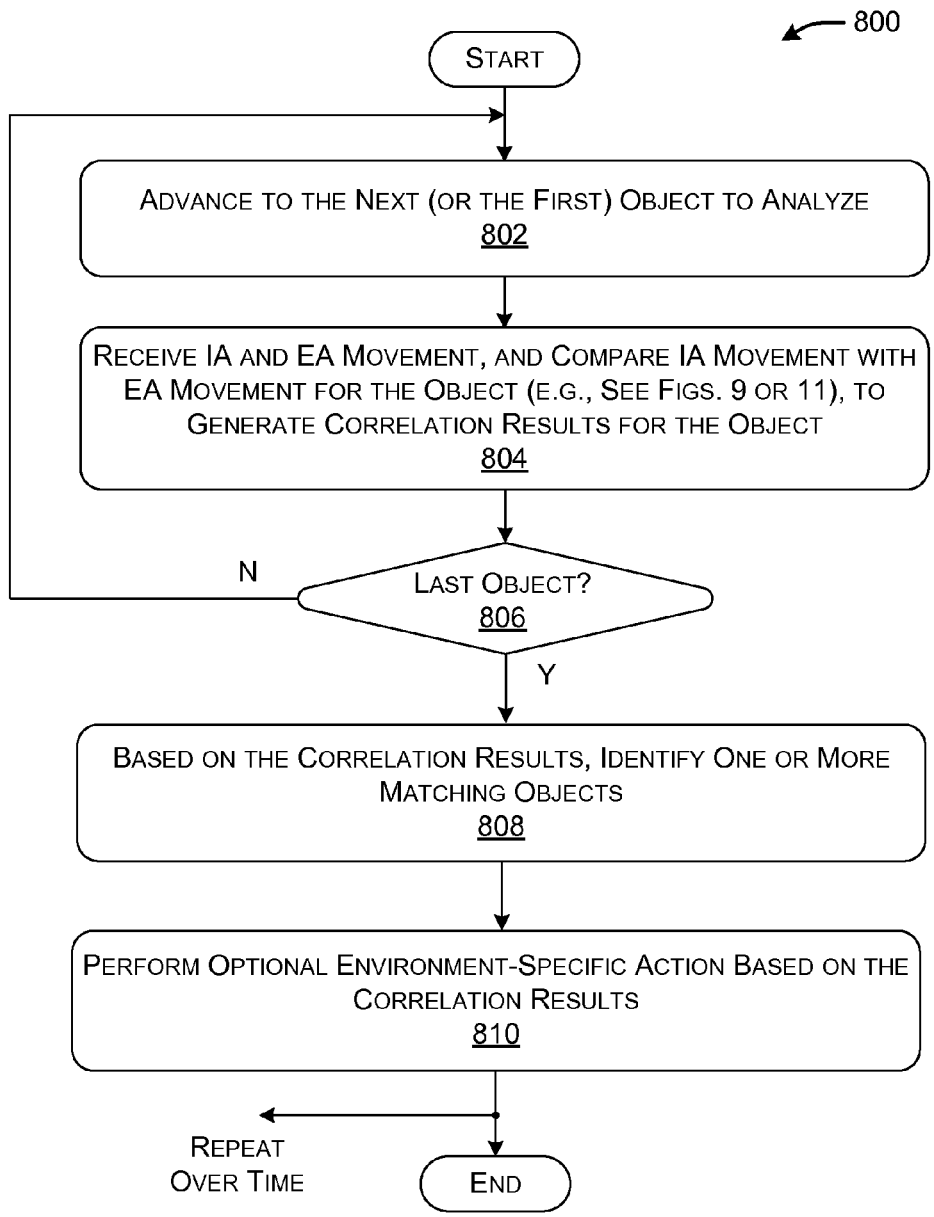
FIG. 8 shows an overview of one procedure for correlating IA movement information with EA movement information.

Starting with FIG. 8, this figure shows a procedure 800 which represents an overview of the movement processing system 202 of FIG. 2. This procedure 800 is performed with respect to each candidate object in the scene. Hence, in block 802, the movement processing system 202 advances to the first candidate object for analysis. Alternatively, the movement processing system 202 can perform any aspect of the processing shown in FIG. 8 in a parallel manner. For example, the movement processing system 202 can analyze plural objects in a parallel manner.

Figure 9:
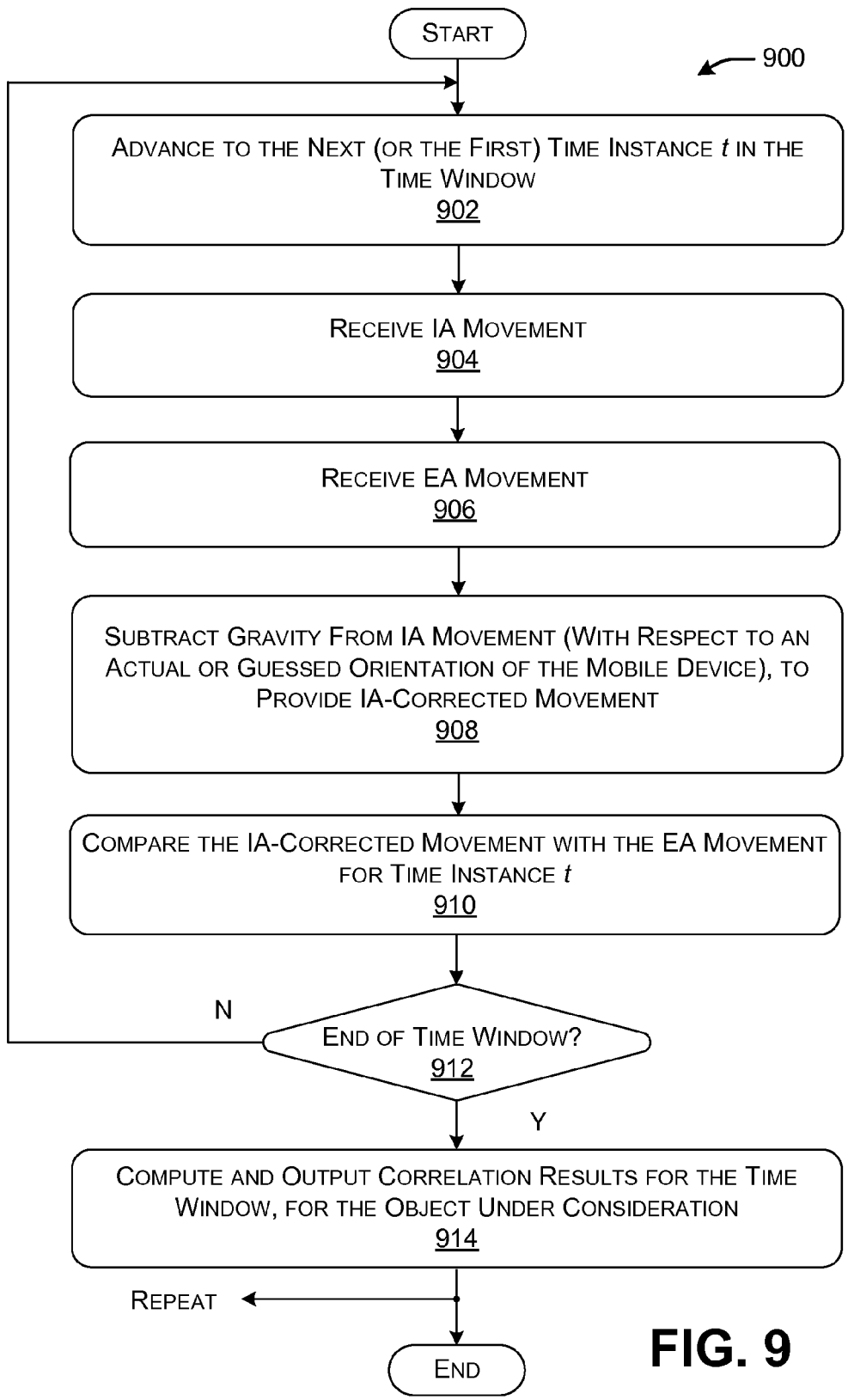
FIG. 9 shows a procedure that provides additional illustrative details regarding a comparing operation that is performed in FIG. 8.
Figure 11:
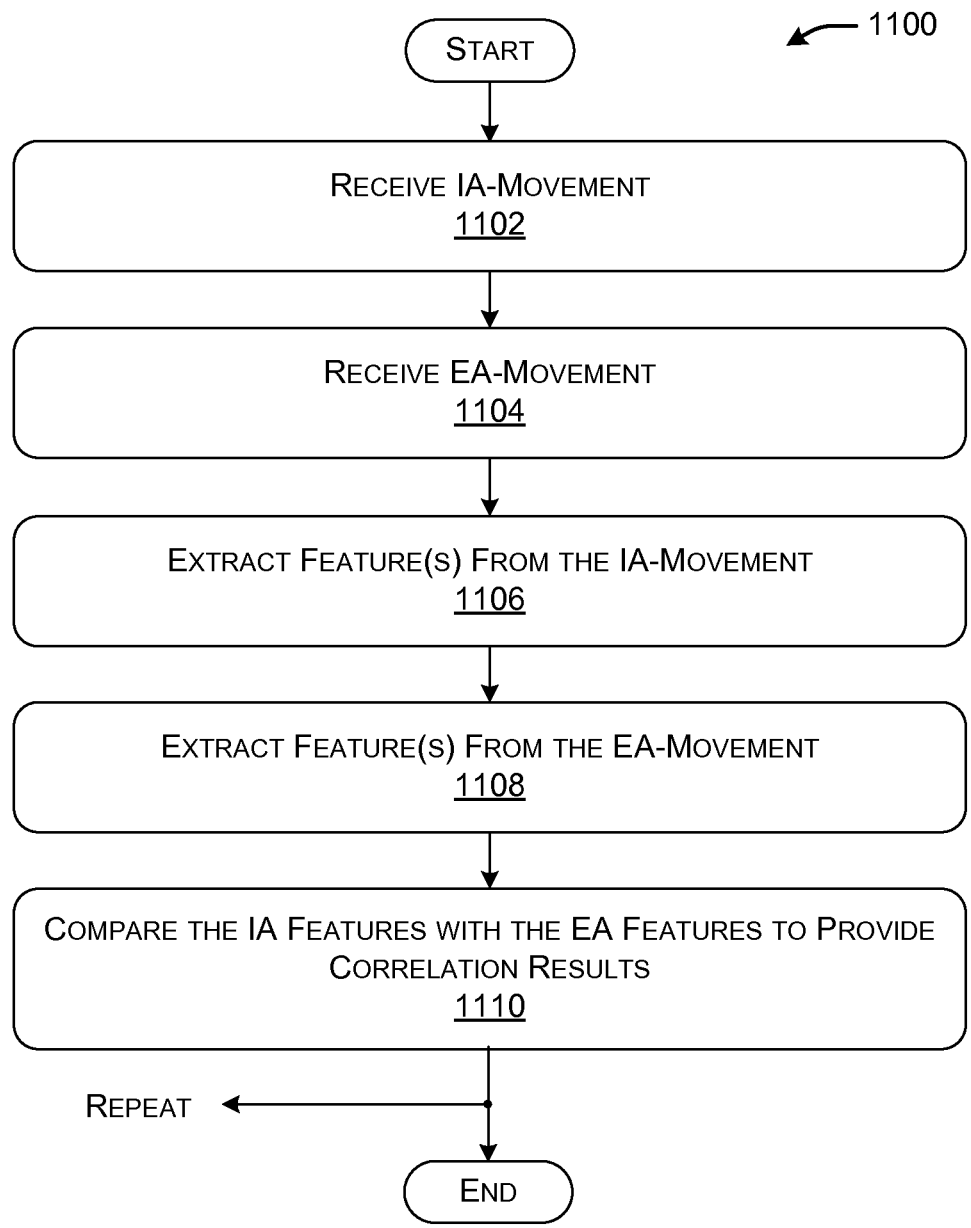
FIG. 11 shows a procedure which represents a different way of performing the comparing operation of FIG. 8 (compared, for instance, to the details set forth in FIG. 9.

In block 804, the movement processing system 202 receives the IA movement information from the mobile device 102 and the EA movement information from the external monitoring system 104. The movement processing system 202 then proceeds to compare the IA movement information with the EA movement information for the object under consideration. This yields correlation results for the object under consideration. FIG. 9 will set forth one way that this operation can be performed. FIG. 11 will set forth another way of performing this operation.

In block 806, the movement processing system 202 determines whether there is another object to analyze in the scene. If so, the movement processing system 202 repeats the above-described procedure with respect to the next object to be analyzed.

In block 808, the movement processing system 202 identifies one or more objects based on the correlation results identified in successive iterations of block 804. For example, the movement processing system 202 can identify the object (or objects) which are associated with the strongest correlation results. These objects are therefore associated with the movement of the mobile device 102. These objects are referred to as matching objects herein.

More specifically, in many scenarios, the movement processing system 202 may determine that the IA movement information is attributed to a single object in the scene. This is because the movement processing system 202 indicates that the strongest correlation results are associated with a single object.

In other scenarios, the movement processing system 202 may determine that the IA movement information is associated with two or more objects, indicating, in turn, that the mobile device 102 is associated with two or more objects. The movement processing system 202 can handle this situation in various environment-specific ways. In one case, the user may be holding the mobile device 102 in one hand, but both hands of the user may remain relatively still. This means that both hands yield EA movement information which appears to match the IA movement information generated by the mobile device 102. In this circumstance, the movement processing system 202 can reject the correlation results. More specifically, the movement processing system 202 can reject the correlation results because the movement information attributed to these objects does not provide a useful basis for comparing the objects.

In another scenario, the user may actually be moving the mobile device 102 with two hands or other body parts. In this case, the movement processing system 202 can associate both objects with the mobile device 102. The mobile device 102 can distinguish this case over the previous case because there is appreciable movement in both hands.

In block 810, the movement processing system 202 performs one or more environment-specific actions based on the correlation results computed in the manner specified above, e.g., based on an outcome of block 808. FIGS. 12-15 will set forth illustrative environment-specific actions that the movement processing system 202 can take.

The procedure of FIG. 8 can be varied in different ways. For example, in one variation, the movement processing system 202 can jump out of the loop (of blocks 802, 804, and 806) once it detects correlation results for an object that are sufficiently strong to indicate that a matching object has been found.

FIG. 9 shows a procedure 900 that represents one way to implement block 804 of FIG. 8. In one case, the movement processing system 202 performs the comparison operation of block 804 over a prescribed time window (T). Hence, in block 902, the procedure 900 indicates that the movement processing system 202 advances to the first time instance (t) in the time window.

In blocks 904 and 906, the movement processing system 202 receives IA movement information and EA movement information with respect to a particular object under consideration. In some cases, the EA movement information is delayed in relation to the IA movement information, or vice versa. The movement processing system 202 can take this delay into consideration by syncing up the IA movement information with the EA movement information.

Figure 10:
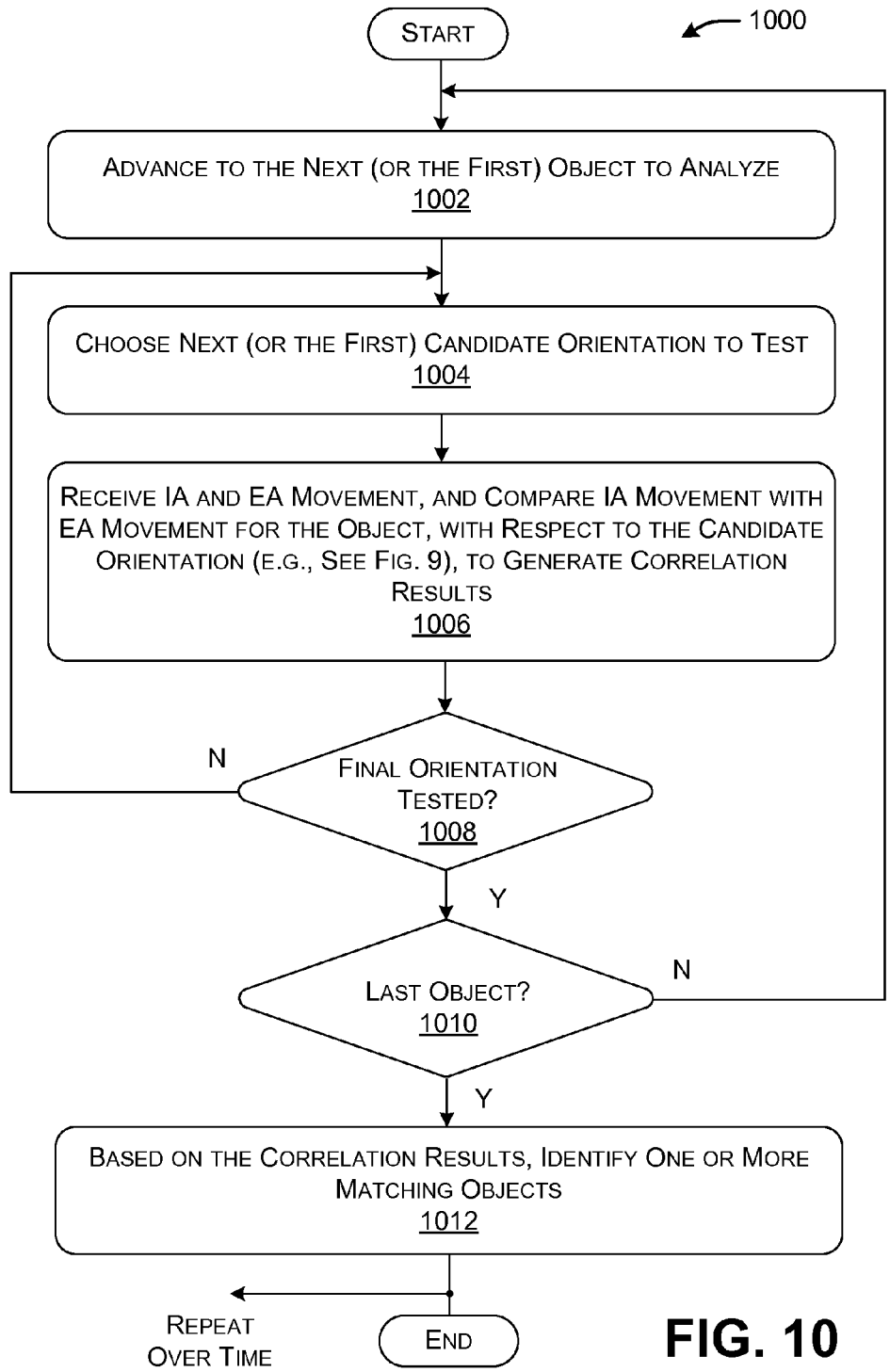
FIG. 10 shows a procedure which represents one version of the comparing operation of FIG. 8; in this case, the orientation of the mobile device is not known in advance.

In block 908, the movement processing system 202 subtracts a contribution of gravity from the IA movement information. In order to perform this operation, the movement processing system 202 takes into consideration the orientation of the mobile device 102. In a first case, the mobile device 102 is able to provide its actual orientation based on the output of two or more position-determining devices 302, such as an accelerometer and a manometer. For this case, then, the block 908 uses the actual orientation of the mobile device 102. In a second case, the mobile device 102 is not able to provide its actual orientation, e.g., because it includes only an accelerometer. In this case, the block 908 may generate and use a guess of the orientation of the mobile device 102; that guess may or may not correspond to the actual orientation of the mobile device 102. FIG. 10, to be described in greater detail below, sets forth the orientation-guessing aspects of the processing performed by the movement processing system 202 in greater detail. In any event, the operation of block 908 produces IA-corrected movement information.

In block 910, the movement processing system 202 can compare the IA-corrected movement information with the EA movement information. For example, the movement processing system 202 can compute and store the difference between the IA-corrected movement information and the EA movement information.

In block 912, the movement processing system 202 determines whether the last time interval in the time window has been encountered. If not, the movement processing system 202 repeats the above-described analysis for the next time instance, for the object under consideration.

In block 914, having performed the comparing operation for the entire time window (T), the movement processing system 202 outputs correlation results (c) for the time window and for the object under consideration (such as the hand of the user 112). For example, the movement processing system 202 can compute a sum of squared differences to yield the correlation results (where each difference is computed in an execution of block 910). The movement processing system 202 then repeats this procedure for all objects (obj) under consideration.

Once the procedure 900 of FIG. 9 has processed all of the objects in the scene, the movement processing system 202 can determine the object(s) that yields the strongest instance ($c_{min}$) of the correlation results. This operation corresponds to block 808 of FIG. 8. More specifically, in one case, $c_{min}$ can be computed using the expression:

$$c_{min} = \min_{obj} \sum_{t} \left\| \overrightarrow{a_{ext}(t)} - \left( R_r \overrightarrow{a_{int}(t)} - \vec{g} \right) \right\|^2.$$

In this expression, the symbol t corresponds to a time instance in the time window T. The symbol $\overrightarrow{a_{ext}(t)}$ is a vector which corresponds to the acceleration of the mobile device 102 as assessed from the perspective of the external monitoring system 104. In other words, this symbol corresponds to the EA movement information at time t. The symbol $\overrightarrow{a_{int}(t)}$ is a vector which refers to the acceleration of the mobile device 102 as assessed from the perspective of the mobile device 102 itself. In other words, this symbol corresponds to the IA movement information at time t. The symbol $\vec{g}$ is a vector that corresponds to the acceleration caused by gravity. And the symbol $R_r$ corresponds to a rotation matrix which orients the acceleration of the mobile device 102 ($\overrightarrow{a_{int}(t)}$) with respect to gravity ($\vec{g}$).

More specifically, in a first case, the movement processing system 202 (or the mobile device 102) can directly compute the absolute orientation of the mobile device 102 based on the IA movement information itself. For this case, $R_r$ represents a matrix that may change with respect to time over a time window, but that matrix can be considered known at each instance of time. In a second case, the movement processing system 202 (or the mobile device 102) cannot readily calculate the absolute orientation of the mobile device 102. For instance, consider the case in which the IA movement information corresponds to only acceleration information provided by an accelerometer. This information expresses the acceleration of the mobile device 102 with respect to a frame of reference that is local to the mobile device 102; but without additional information, that frame of reference cannot be aligned with the acceleration associated with the force of gravity. Therefore, for this case, $R_r$ represents a guess at the orientation of the mobile device 102 with respect to gravity. In this case, to simplify analysis, $R_r$ can be approximated as a fixed (but unknown) matrix over all time instances in the window.

In the latter case (in which the absolute orientation is not known a priori), the movement processing system 202 can indirectly compute the correct rotation matrix $R_r$, by computing the correlation results for different orientations, for each object. One orientation, for one of the objects, will generally yield correlation results that are sufficiently strong compared to the other instances of the correlation results. This orientation therefore identifies both: (a) the absolute orientation of the mobile device 102; and (b) the object (e.g., hand) which is associated with the mobile device 102. The above equation can be modified to represent the case in which the orientation is unknown by indicating that the "min" operation (which selects the minimum correlation results) is performed by considering all of the objects in the scene and, for each object, all the "guessed" orientations.

The following description sets forth addition details regarding the two embodiments described above—namely, a first embodiment in which the absolute orientation is known and a second embodiment in which the absolute orientation is not known.

First consider the case in which the movement processing system 202 (or the mobile device 102) can compute the absolute orientation of the mobile device 102. The movement processing system 202 can use various techniques for performing this calculation, such as the triad algorithm. For example, assume that the mobile device 102 includes a 3-axis accelerometer which yields a measured acceleration $a_b$. That acceleration is related to gravity (g) according to the following expression, $a_b = R^{b \to i} g$. In this expression, $R^{b \to i}$ corresponds to a rotation matrix which relates g to $a_b$. Further assume that the mobile device 102 includes a 3-axis magnetometer which provides a measured magnetometer reading of $m_b$. That magnetometer reading is related to magnetic north (N) according to the following expression, $m_b = R^{b \to i} N$. In this expression, $R^{b \to i}$ corresponds to a rotation matrix which relates N to $m_b$ (which is the same rotation matrix used to convert g to $a_b$).

To compute $R^{b \to i}$, the movement processing system 202 first computes two intermediary matrices, $R^{b \to t}$ and $R^{i \to t}$. More specifically, the intermediary rotation matrix $R^{b \to t}$ has the elements in the matrix $[t_{1b} \ t_{2b} \ t_{3b}]$, while the intermediary rotation matrix $R^{i \to t}$ has the elements in the matrix $[t_{1i} \ t_{2i} \ t_{3i}]$.

The element $t_{1b} = m_b$, while the element $t_{1i} = N$. The element $t_{2b} = (a_b \times m_b)/|a_b \times m_b|$, while the element $t_{2i} = (g \times N)/|g \times N|$. And the element $t_{3b} = t_{1b} \times t_{2b}$, while the element $t_{3i} = t_{1i} \times t_{2i}$. Finally, the desired rotation matrix $R^{b \to i}$ equals $R^{b \to t} R^{t \to i}$, which equals $R^{b \to t} (R^{i \to t})^T$.

Alternatively, or in addition, the movement processing system 202 can use other techniques to compute the absolute orientation of the mobile device 102 based on different parts of the IA movement information, provided by different respective position-determining devices 302. For example, the movement processing system 202 can use a technique that leverages a direction cosine matrix to provide the absolute orientation.

Next consider the second scenario in which the movement processing system 202 (or the mobile device 102) cannot directly compute the absolute orientation of the mobile device 102. FIG. 10 shows a procedure 1000 by which the movement processing system 202 can indirectly compute the absolute orientation. The processing shown in FIG. 10 is performed for each object under consideration. Although FIG. 10 shows that operations are performed in a sequence, any aspects of the procedure 1000 can be performed in parallel.

In block 1002, the movement processing system 202 advances to the next (or the first) object under consideration. In block 1004, the movement processing system 202 chooses a next (or the first) possible orientation of the mobile device 102 with respect to gravity. In other words, this orientation represents a guess at the matrix $R_r$ specified in the above equation, which may or may not correspond to the correct absolute orientation of the mobile device 102.

In block 1006, the movement processing system 202 performs the procedure 900 of FIG. 9 for a particular guessed orientation, with respect to a particular object. This procedure 900 involves receiving IA movement information, receiving EA movement information, and calculating the correlation between these two pieces of movement information using the expression stated above. This operation yields correlation results for the object and orientation under consideration.

In block 1008, the movement processing system 202 determines whether there is another orientation to be tested. If so, the movement processing system 202 repeats blocks 1004 and 1006 for a next orientation. In block 1010, the movement processing system 202 determines whether there is another object to be analyzed. If so, the movement processing system 202 repeats blocks 1004, 1006, and 1008 for the next object to be considered. Alternatively, the movement processing system 202 can terminate its analysis whenever it discovers a candidate object and a candidate orientation which produce sufficiently strong correlation results.

In block 1012, the movement processing system 202 identifies one or more matching objects. For example, the movement processing system 202 can identify the object and orientation yielding the strongest correlation results. This object constitutes the matching object.

FIG. 11 shows yet another procedure 1100 for performing the analysis in block 804 of FIG. 8. In this case, the movement processing system 202 uses a feature-based approach to compute the correlation between the IA movement information and the EA movement information. This procedure 1100 does not depend on whether or not the absolute orientation of the mobile device 102 is known a priori. But this procedure 1100 also does not determine the orientation of the mobile device 102; that is, it provides insight as to what object in the scene corresponds to the mobile device 102, but it does not compute the orientation of the mobile device 102 in the scene.

In blocks 1102 and 1104, the movement processing system 202 receives the IA movement information and the EA movement information, respectively. In blocks 1106 and 1108, the movement processing system 202 computes features for the IA movement information and the EA movement information, respectively, for a candidate object under consideration. This yields IA features and EA features, respectively. The features correspond to any telltale information which characterizes the movement information for a candidate object under consideration. For example, a feature can identify one or more prominent spikes in acceleration exhibited in the movement information. But any characteristic of the signals associated with the movement information may be formulated into a feature of that movement information.

In block 1110, the movement processing system 202 compares the IA features with the EA features to provide correlation results for the particular object under consideration. When the procedure 1100 has been performed for all objects in the scene, the movement processing system 202 can identify the object(s) that are associated with the strongest correlation results. These object(s) constitute matching object(s).

Figure 12:
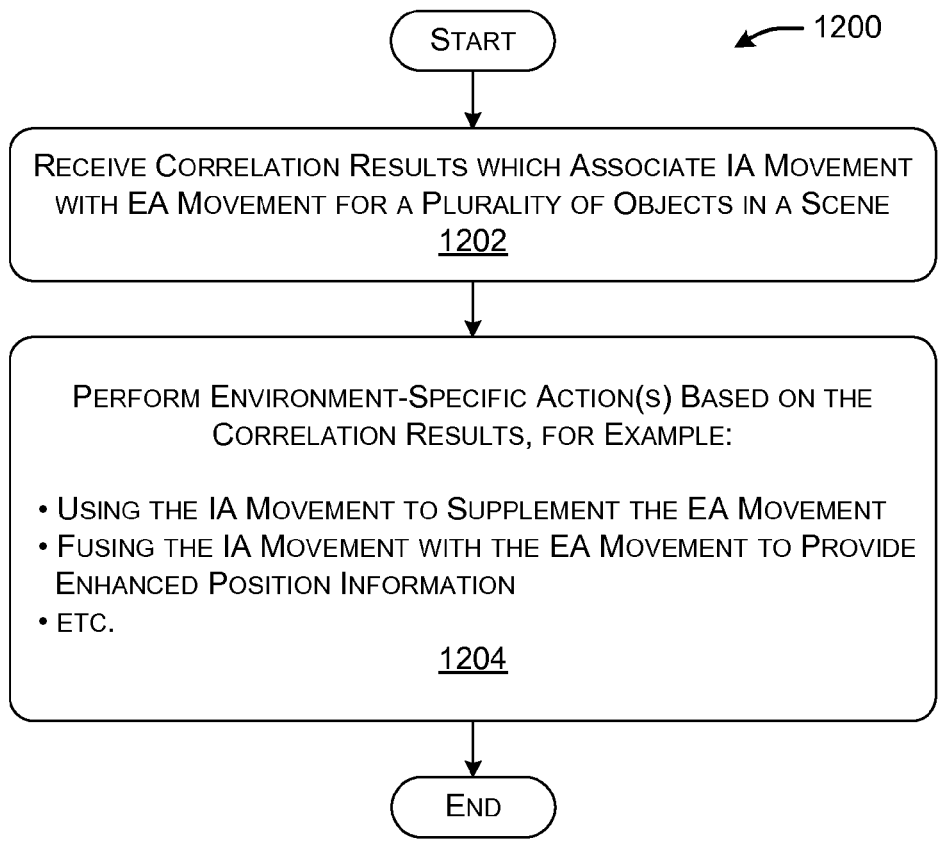
FIG. 12 shows a procedure that describes various ways of applying the correlation results provided by the procedure of FIG. 8.

FIG. 12 shows a procedure 1200 which represents the operation of one or more application modules of the movement processing system 202. In block 1202, the application modules receive the correlation results computed in any of the ways described above. The application modules also may receive the original IA movement information and/or the original EA movement information. In block 1204, based on these inputs, each application module performs an environment-specific action.

For example, some application modules can use the IA movement information to supplement the EA movement information. More specifically, the IA movement information expresses some aspects of movement that may not be readily expressed by the EA movement information, and vice versa. For example, the IA movement information yields fine detail regarding the orientation of the mobile device 102, and by extension, the hand or other body part which holds the mobile device 102 or is otherwise associated with the mobile device 102. But the IA movement information does not identify, at least with sufficient precision, the absolute location of the hand and the mobile device 102 in space. The EA movement information, on the other hand, provides position information which identifies the location of the hand and the mobile device 102 in space, but does not provide detailed orientation information. Hence, by combining the IA movement information and the EA movement information, an application module can determine both the placement of an object in space and the orientation of the object at that position.

Alternatively, or in addition, some application modules can fuse the IA movement information with the EA movement information to yield more refined position information (or other movement information) than is supplied by either the IA movement information or the EA movement information by itself. More specifically, the mobile device 102 reports the IA movement information at a relatively high sampling rate and at a relatively low latency. The external monitoring system 104 reports the EA movement information at a lower sampling rate and higher latency compared to the IA movement information. Hence, by combining the IA movement information and the EA movement information, an application module can yield position information (or other movement information) that is both complete and precise. As described in Section A, an application module can use a Kalman filter and/or other data fusion technique(s) to combine the IA movement information and the EA movement information.

Figure 13:
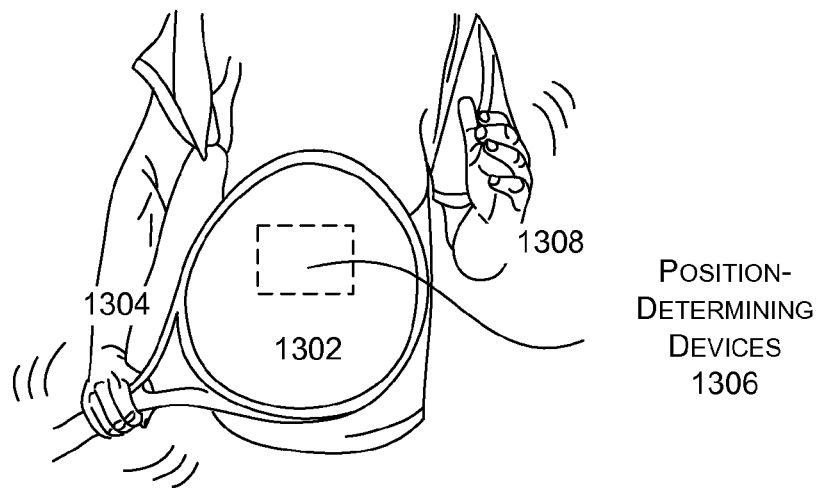
FIGS. 13-15 depict various use scenarios of the system of FIG. 2.

FIG. 13 shows a depiction of one use scenario of the system 200. In this case, the user is playing a virtual game which simulates a racket sport. To this end, the user holds a racket 1302 (or paddle) in his or her right hand 1304 and manipulates the racket 1302 to simulate striking a ball or other object. The racket 1302 may include one or more position-determining devices 1306 embedded therein or otherwise associated with the racket 1302. The position determining devices 1306 perform the role described above of determining the movement of the racket 1302 from the perspective of the racket 1302. That is, the position determining devices 1306 supply the IA movement information. The user may make various extraneous movements with his or her left hand 1308 (and/or with any other part of his or her body). An external monitoring system (not shown) can also capture all of the movements in the scene from an external perspective using any of the techniques described above, such as by matching the user's body pose with a predetermined model and then determining the motion of the body parts of the user that have been recognized. That is, the external monitoring system supplies the EA motion information.

In this application, the movement processing system 202 can first determine which hand of the user is holding the racket using any of the correlation techniques described above. Once this conclusion has been reached, the movement processing system 202 can combine the IA movement information with the EA movement information in various ways. For example, the movement processing system 202 can use the IA movement information to determine the orientation at which the user is aiming the racket 1302. The movement processing system 202 can use the EA movement information to determine the location in space at which the user is holding the racket 1302. Collectively, this knowledge can be used to provide enhanced control information which is used to control any target system, such as a game system. For example, the user's movements can be used to control the movements of a computer-generated avatar which is playing a racket-related game with an opponent. A user may observe the motions of the avatar and the opponent on a display device (not shown) as the user plays the game.

Alternatively, or addition, the movement processing system 202 can combine the IA movement information with the EA movement information to provide a more precise indication of the position of the right hand 1304 of the user in space and/or the position of the racket 1302 itself (compared to position information that is obtained from either the IA movement information or the EA movement information considered by itself).

Figure 14:
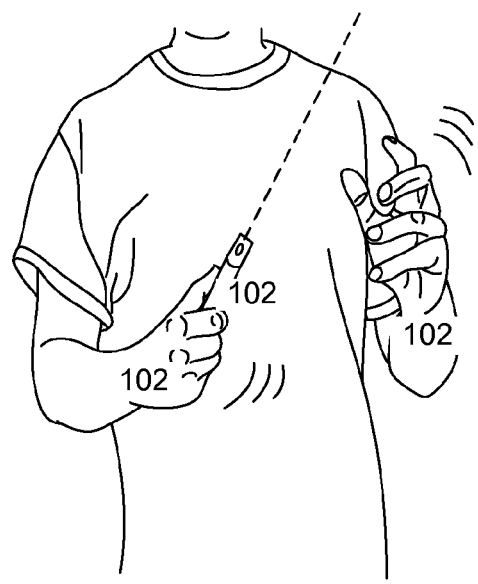

FIG. 14 shows a use scenario which is similar to that shown in FIG. 13. Here, the user is holding a pointer 1402 in his or her right hand 1404, while also making extraneous movements with his or her left hand 1406. For example, the user may be providing a demonstration in the context of a meeting; in this setting, the user may point the pointer 1402 at a part of a chart or other article. (The pointer 1402 may or may not actually emit a beam of real light.) In this context, the movement processing system 202 can use the IA movement information and the EA movement information to provide enhanced control information and/or enhanced position information. As a result, the movement processing system 202 can enable the user to point to a target article with increased accuracy.

Figure 15:
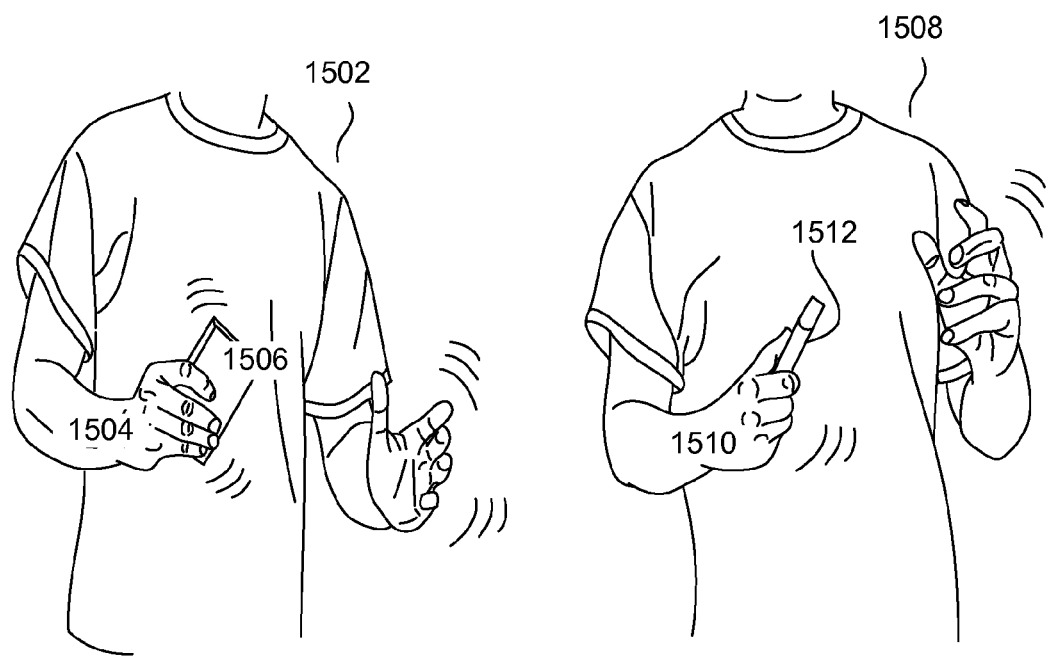

FIG. 15 shows a use scenario in which the scene includes two or more subjects (here, human beings). Each subject is constituted by plural objects (e.g., plural body parts). For example, assume that a first user 1502 is using his or her right hand 1504 to manipulate a first mobile device 1506. Assume that a second user 1508 is using his or her right hand 1510 to manipulate a second mobile device 1512. In this context, the movement processing system 202 can identify the mobile devices (1506, 1512) which are associated with respective users (1502, 1508). This is because the movement processing system 202 can determine that there is a strong correlation between the motion of the mobile device 1506 and the movement of the right hand 1504 of the user 1502, and there is a strong correlation between the motion of the mobile device 1512 and the right hand 1510 of the user 1508. Hence, in this process, the movement processing system 202 has also determined the association between body parts and the mobile devices. Viewed in a more abstract context, the movement processing system 202 views the scene in an agnostic manner as populated by a number of candidate objects, any of which may be associated with any source of IA movement information; in actuality, some of these candidate objects correspond to body parts of the first user 1502 and some of the objects correspond to body parts of the second user 1508.

One or more application modules can perform further tasks after associating a mobile device (such as the mobile device 1506) with a particular person in a scene (such as the first user 1502). For example, a security system can allow the person who is holding the mobile device 1506 to gain access to a restricted area, but not the person who is holding mobile device 1512. In this scenario, the mobile device 1506 functions as a motion-based key or a pass, conferring certain rights to the person who happens to be holding the mobile device 1506.

In another case, the external monitoring system 104 (or some other system) can use any type of user recognition technology to determine the identity of the person holding a mobile device, e.g., using image-based face recognition technology, voice recognition technology, etc., or any combination thereof. An application module can then provide any type of personalized service to the user by virtue of the fact that the user is holding the mobile device. For example, a retrieval system can provide the first user 1502 with access to a collection of his or her stored items (e.g., documents, videos, pictures, etc.). Or a controller system can adjust settings in a particular environment based on the prior-specified preferences of the first user 1502. Or a game system can associate the first user 1502 with a particular prior-registered player, enabling score information generated by the first user 1502 to be associated with an appropriate game-playing account, and so on.

The applications described above are cited by way of example, not limitation. The movement processing system 202 can be applied to yet other use scenarios in any environment, including gaming environments, business environments, scientific and engineering environments, medical environments, and so on. For example, the movement processing system 202 can use the techniques described above to provide enhanced control information and/or position information for use in controlling the movement of a robot or other automated piece of equipment in any environment.

Further, the principles set forth above can be extended in various ways. For example, the movement processing system 202 can perform correlation based on three or more instances of movement information. Moreover, the movement processing system 202 need not receive all such instances of movement information at the same time. For example, the movement processing system 202 can establish a correlation based on two or more instances of movement information. At this juncture, one or more new instances of movement information can be added, and/or one or more existing instances of movement information can be removed.

Consider the following illustration of the above use scenario. Assume that the movement processing system 202 receives a first instance of IA movement information from position-determining devices within a wristband which the user has applied to his or her left wrist. The wristband constitutes a first mobile device. The movement processing system 202 also receives EA movement information from an external monitoring system. The movement processing system 202 can compare the IA movement information with the EA movement information in the manner described above to determine that the wristband is associated with the user's left hand. Then assume that the user picks up a second mobile device, such as a mobile phone or a game implement. The second mobile device supplies a second instance of IA movement information. At this point, the movement processing system 202 can compare all three instances of movement information with each other to identify a matching candidate object (i.e., the left hand of the user). In this case, the use of three instances of movement information increases the confidence at which the movement processing system 202 can determine its correlation results. And after identifying the matching object, the movement processing system 202 can then combine all three instances of movement information in the manner specified above, e.g., to provide enhanced control information, enhanced position information, etc.

In yet another variation, the movement processing system 202 can perform matching based on two (or more) instances of IA movement information (without EA movement information), such as, in the above example, the IA movement information received from the wristband and the IA movement information received from the second mobile device. By doing so, the movement processing system 202 can determine that the hand which is associated with the wristband is also the hand that is holding the second mobile device. Further assume that the user has previously manually specified that he or she is wearing the wristband on her left hand. (Or this conclusion can be based on a combination of IA movement information and EA movement information in the manner described above, but where the EA movement information is no longer being received.) In this case, the movement processing system 202 can also determine (or confirm) that the user is holding the second mobile device in her left hand.

More generally, the movement processing system 202 can be said to receive and process at least a first instance of movement information and a second instance of movement information, where the first instance can correspond to IA movement information provided by a mobile device, and the second instance of movement information can correspond to either IA movement information or EA movement information received from any source other than the mobile device. At any juncture, new instances of movement information can be added, and existing instances of movement information can be removed.

C. Representative Computing Functionality

FIG. 16 sets forth illustrative computing functionality 1600 that can be used to implement any aspect of the functions described above. For example, the computing functionality 1600 can be used to implement any aspect of the movement processing system 200, the mobile device 102, and/or the external monitoring system 104. In one case, the computing functionality 1600 may correspond to any type of computing device that includes one or more processing devices. In all cases, the electrical data computing functionality 1600 represents one or more physical and tangible processing mechanisms.

The computing functionality 1600 can include volatile and non-volatile memory, such as RAM 1602 and ROM 1604, as well as one or more processing devices 1606 (e.g., one or more CPUs, and/or one or more GPUs, etc.). The computing functionality 1600 also optionally includes various media devices 1608, such as a hard disk module, an optical disk module, and so forth. The computing functionality 1600 can perform various operations identified above when the processing device(s) 1606 executes instructions that are maintained by memory (e.g., RAM 1602, ROM 1604, or elsewhere).

More generally, instructions and other information can be stored on any computer readable medium 1610, including, but not limited to, static memory storage devices, magnetic storage devices, optical storage devices, and so on. The term computer readable medium also encompasses plural storage devices. In all cases, the computer readable medium 1610 represents some form of physical and tangible entity.

The computing functionality 1600 also includes an input/output module 1612 for receiving various inputs (via input modules 1614), and for providing various outputs (via output modules). One particular output mechanism may include a presentation module 1616 and an associated graphical user interface (GUI) 1618. The computing functionality 1600 can also include one or more network interfaces 1620 for exchanging data with other devices via one or more communication conduits 1622. One or more communication buses 1624 communicatively couple the above-described components together.

The communication conduit(s) 1622 can be implemented in any manner, e.g., by a local area network, a wide area network (e.g., the Internet), etc., or any combination thereof. The communication conduit(s) 1622 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by computing functionality, for assessing movement of a mobile device associated with a subject in a scene, comprising:

receiving internal-assessed (IA) movement information regarding the movement of the mobile device from at least one position-determining device provided by the mobile device;

receiving external-assessed (EA) movement information from at least one monitoring system which captures images of the scene containing the subject and the mobile device;

comparing the IA movement information with the EA movement information for a candidate object associated with the subject using a candidate orientation of the mobile device;

repeating, at least one time, said comparing with respect to another candidate object, each iteration of said comparing producing correlation results;

determining, based on the correlation results for each candidate object, at least one matching object which is associated with the mobile device by selecting a candidate object with the strongest correlation results as a matching object; and fusing the IA movement information with the EA movement information to yield more precise IA and EA movement information comprising a more precise location in space and a more precise orientation in space for the at least one matching object;

performing an environment-specific action using the fused IA and EA information for the matching object based on an outcome of said determining, said receiving of the IA movement information, receiving of the EA movement information, comparing, repeating, determining, fusing and performing being implemented by the computing functionality.

2. The method of claim 1, wherein the subject comprises a human being, and where each candidate object corresponds to a part of the human being.

3. The method of claim 1, wherein the correlation results for a given candidate object are obtained by using a candidate orientation of the mobile device and a comparison of the IA movement information with the EA movement for the given candidate object with respect to the candidate orientation.

4. The method of claim 1, wherein the strongest correlation results for a candidate object are obtained by using, at a given time, an acceleration of the mobile device obtained from the EA movement information, an acceleration of the mobile device obtained from the IA movement information, an acceleration caused by gravity and the orientation of the acceleration of the mobile device with respect to gravity.

5. The method of claim 1, wherein the mobile device corresponds to a device that is associated with part of an anatomy of a human being.

6. The method of claim 1, wherein the monitoring system comprises an apparatus which generates the EA movement information by:

generating a depth image of the scene;

identifying each candidate object within the scene based on the depth image; and assessing movement of each candidate object in the scene.

7. The method of claim 6, wherein the monitoring system identifies each candidate object by comparing the depth image with a multi-part skeletal model of the subject.

8. The method of claim 1, further comprising:

removing a contribution of gravity from the IA movement information, based on an orientation of the mobile device, to provide IA-corrected movement information, wherein said comparing comprises comparing said IA-corrected movement information with the EA movement information.

9. The method of claim 8, wherein the orientation of the mobile device comprises an actual orientation of the mobile device that is assessed based on the IA movement information received from the mobile device.

10. The method of claim 8, wherein the orientation of the mobile device comprises a guessed orientation of the mobile device.

11. The method of claim 10, wherein the guessed orientation of the mobile device comprises an actual orientation of the mobile device if a matching object is identified based on use of the guessed orientation.

12. The method of claim 8, wherein said comparing comprises comparing said IA-corrected movement information with the EA movement information over a time window.

13. The method of claim 1, wherein said comparing comprises:

extracting at least one feature from the IA movement information, to provide at least one IA feature;

extracting at least one feature from the EA movement information, to provide at least one EA feature; and comparing said at least one IA feature with said at least one EA feature.

14. The method of claim 1, wherein said performing comprising:

supplementing the EA movement information with the IA movement information to provide enhanced control information with respect to at least one matching object in the scene; and using the enhanced control information to control operation of a target system.

15. The method of claim 14, wherein said supplementing comprises adding orientation information that is obtained from the IA movement information to the EA movement information, the orientation information pertaining to an orientation of said at least one matching object.

16. The method of claim 1, wherein said fusing the EA movement information with the IA movement information to provide more precise EA movement information and more precise IA movement information comprises providing a precise position in space and a precise orientation at that position for at least one matching object in the scene.

17. A computer readable storage device for storing computer readable instructions, the computer readable instructions providing a movement processing system when executed by one or more processing devices, the computer readable instructions comprising:

logic configured to receive first movement information of a mobile device from at least one position-determining device provided by the mobile device;

logic configured to receive second movement information of the mobile device from at least one other source external to the mobile device that captures images of the mobile device and objects as part of a scene;

logic configured to identify one or more candidate objects associated with the mobile device by comparing a depth image with a model of a human being;

logic configured to compare the first movement information with the second movement information for each of the candidate objects using a candidate orientation of the mobile device, producing correlation results; and logic configured to identify a matching object which is associated with the mobile device, based on the correlation results.

18. The computer readable storage medium of claim 17, further comprising logic configured to remove a contribution of gravity from the first movement information prior to said correlating, based on an orientation of the mobile device, wherein the orientation of the mobile device comprises an actual orientation of the mobile device that is assessed based on the first movement information received from the mobile device.

19. The computer readable storage medium of claim 17, further comprising logic configured to remove a contribution of gravity from the first movement information prior to said correlating, based on an orientation of the mobile device, wherein the orientation of the mobile device comprises a guessed orientation of the mobile device.

20. A movement processing system, implemented by computing functionality, for assessing movement of a mobile device in a scene, comprising:
  a correlation processing module, comprising:
    logic configured to receive internal-assessed (IA) movement information of the mobile device from at least one position-determining device provided by the mobile device;
    logic configured to receive external-assessed (EA) movement information of the mobile device from at least one monitoring system which captures at least one image of the scene containing a human being and the mobile device;
    logic configured to identify the location of a plurality of candidate parts of a human being associated with the mobile device;
    logic configured to compare the IA movement information of the mobile device with the EA movement information with respect to a plurality of candidate parts of the human being, to produce correlation results for each candidate part using a candidate orientation of the mobile device; and
    logic configured to determine, based on the correlation results for each candidate part, at least one matching part which is associated with the mobile device by using the correlation results for each candidate part and selecting the candidate part with the greatest correlation as the matching part associated with the mobile device; and
  at least one application module, comprising:
    logic configured to supplement the EA movement information of the mobile device with the IA movement information of the mobile device to provide enhanced control information with respect to at least one matching candidate part in the scene; and
    logic configured to use the enhanced control information to control operation of a target system.

* * * * *